(12) United States Patent
Berthet

(10) Patent No.: US 7,682,177 B2
(45) Date of Patent: Mar. 23, 2010

(54) CONNECTOR WITH AN ANTI-UNLOCKING SYSTEM

(75) Inventor: Vincent Berthet, Joseph de Riviere (FR)

(73) Assignee: Radiall, Rosny Sous Bois (FR)

( * ) Notice: Subject to any disclaimer, the term of this patent is extended or adjusted under 35 U.S.C. 154(b) by 0 days.

(21) Appl. No.: 12/314,225

(22) Filed: Dec. 5, 2008

(65) Prior Publication Data
US 2009/0156043 A1 Jun. 18, 2009

(30) Foreign Application Priority Data
Dec. 14, 2007 (FR) .................................. 07 59846

(51) Int. Cl.
*H01R 4/38* (2006.01)
(52) U.S. Cl. ..................................... 439/321
(58) Field of Classification Search ................ 439/321, 439/320, 312
See application file for complete search history.

(56) References Cited

U.S. PATENT DOCUMENTS

| | | | | |
|---|---|---|---|---|
| 2,606,224 | A * | 8/1952 | Modrey | 439/294 |
| 2,728,895 | A * | 12/1955 | Quackenbush et al. | 439/321 |
| 3,104,144 | A * | 9/1963 | Sprole | 439/321 |
| 3,343,852 | A * | 9/1967 | Blight et al. | 285/82 |
| 3,380,505 | A * | 4/1968 | Heath | 411/221 |
| 3,917,373 | A * | 11/1975 | Peterson | 439/321 |
| 4,059,324 | A * | 11/1977 | Snyder et al. | 439/321 |
| 4,109,990 | A * | 8/1978 | Waldron et al. | 439/321 |
| 4,497,530 | A * | 2/1985 | Shannon | 439/312 |
| 4,531,802 | A | 7/1985 | Tomsa | |
| 4,648,670 | A * | 3/1987 | Punako et al. | 439/321 |
| 4,741,706 | A * | 5/1988 | Takeda et al. | 439/318 |
| 5,035,640 | A * | 7/1991 | Drogo | 439/321 |
| 5,181,860 | A * | 1/1993 | Honma et al. | 439/321 |
| 5,192,219 | A | 3/1993 | Fowler | |
| 5,366,383 | A * | 11/1994 | Dearman | 439/321 |

(Continued)

FOREIGN PATENT DOCUMENTS

| | | |
|---|---|---|
| FR | 2 379 918 | 9/1978 |
| FR | 2 893 192 A | 5/2007 |
| GB | 1590403 | 6/1981 |

*Primary Examiner*—T C Patel
*Assistant Examiner*—Vladimir Imas
(74) *Attorney, Agent, or Firm*—Dowell & Dowell, PC

(57) ABSTRACT

A connector comprising:
   a body for plugging in or on the body of a complementary connector along a plugging axis X-X';
   connection means for co-operating with complementary connection means of the complementary connector so as to connect together electrical or optical conductors; and
   a locking sleeve that surrounds the body of the connector and that is adapted to co-operate with the body of the connector and with locking means provided by the complementary connector in such a manner as to block relative movement between the connector and the complementary connector in the plugging direction, the locking sleeve being movable in rotation about the axis relative to the body of the connector between an unlocking position in which the connectors can be separated and a locking position in which the connectors cannot be separated;
wherein the connector includes a brake ring that co-operates with the body of the connector by being movable at least in rotation about the axis between a braking position in which the ring opposes any turning of the locking sleeve and a disengaged position in which the ring does not oppose any turning of the locking sleeve.

9 Claims, 4 Drawing Sheets

U.S. PATENT DOCUMENTS

| | | | |
|---|---|---|---|
| 5,435,760 A * | 7/1995 | Miklos | 439/321 |
| 5,456,614 A * | 10/1995 | Szegda | 439/321 |
| 5,468,161 A * | 11/1995 | Wright | 439/610 |
| 5,785,545 A * | 7/1998 | Holt | 439/352 |
| 6,358,078 B1 * | 3/2002 | Crippa | 439/321 |
| 6,368,135 B1 * | 4/2002 | Ho | 439/321 |
| 6,602,085 B2 * | 8/2003 | Young et al. | 439/321 |
| 6,884,099 B1 * | 4/2005 | Cannon | 439/318 |
| 6,957,972 B2 * | 10/2005 | Starke et al. | 439/320 |
| 7,018,226 B2 * | 3/2006 | Milner et al. | 439/321 |
| 7,063,550 B1 * | 6/2006 | Chen et al. | 439/320 |
| 7,331,807 B2 * | 2/2008 | Scholler et al. | 439/320 |
| 2004/0018764 A1 * | 1/2004 | Thurston | 439/312 |
| 2006/0172580 A1 * | 8/2006 | Scholler et al. | 439/321 |

* cited by examiner

CONNECTOR WITH AN ANTI-UNLOCKING SYSTEM

FIELD OF THE INVENTION

The present invention relates to the technical field of connectors used for making easily-separable connections between conductors of an electric and/or optical cable and a system or another electric and/or optical cable.

The invention relates more particularly to the field of connectors in which connection with a complementary connector is performed along a plugging axis, the connectors thus being coupled together or uncoupled by a movement in translation parallel to the plugging axis.

BACKGROUND OF THE INVENTION

In order to guarantee a certain amount of reliability for the connections made and avoid any disconnection, such connectors are fitted with a locking sleeve that is designed to co-operate with locking means provided by the complementary connector. Thus, the locking sleeve can make use of a bayonet locking system or may indeed include a thread for co-operating with a complementary thread of the complementary connector. Such a locking sleeve is thus movable in rotation between an unlocking position in which the connectors can be assembled or separated, and a locking position in which, once the connectors have been plugged together, it is no longer possible to separate them.

Such a locking sleeve gives full satisfaction in terms of its function of providing an obstacle to unwanted separated of connectors that are connected together. Nevertheless, under certain conditions of use, and in particular when the connectors that are connected together are subjected to various stresses in traction or in rotation, or indeed are subjected to vibration, it is found that the locking sleeve can itself go in unwanted manner from its locking position to its unlocking position where it is no longer capable of performing its function of making the connection secure.

OBJECT AND SUMMARY OF THE INVENTION

There is therefore a need for a novel type of connector that is capable of reliably guaranteeing the connection while reducing any risk of untimely unlocking of the locking sleeve.

To achieve this object, the invention relates to a connector comprising:
- a body for plugging in or on the body of a complementary connector along a plugging axis X-X';
- connection means for co-operating with complementary connection means of the complementary connector so as to connect together electrical or optical conductors; and
- a locking sleeve that surrounds the body of the connector and that is adapted to co-operate with the body of the connector and with locking means provided by the complementary connector in such a manner as to block relative movement between the connector and the complementary connector in the plugging direction, the locking sleeve being movable in rotation about the axis X-X' relative to the body of the connector between an unlocking position in which the connectors can be separated and a locking position in which the connectors cannot be separated.

According to the invention, the connector further comprises a brake ring that co-operates with the body of the connector by being movable at least in rotation about the axis X-X' between a braking position in which the ring opposes any turning of the locking sleeve and a disengaged position in which the ring does not oppose any turning of the locking sleeve.

Thus, implementing such a brake ring serves to provide an obstacle to unwanted unlocking of the locking sleeve. In the invention, the braking provided by the brake ring can be performed in any suitable manner, the brake ring co-operating with or coming into contact with the locking sleeve in the braking position.

Furthermore, in the invention, such a brake ring can be associated with locking sleeves that implement various types of locking, such as for example bayonet locking or indeed screw locking making use of helical link means for co-operating with locking means of the complementary connector.

According to a characteristic of the invention, the helical link means comprise a thread formed inside or outside the locking sleeve and designed to co-operate with a complementary thread provided by the complementary connector.

According to the invention, the connection between the body of the connector and the brake ring can be implemented in any appropriate manner, providing the passage of the ring between its disengaged position and its braking position necessarily involves the ring turning about the plugging axis X-X'. Thus, in the invention, the brake ring and the body of the connector can be linked together by a bayonet-type connection, with the passage from the disengaged position to the braking position involving firstly movement in translation followed by turning about the plugging axis X-X'.

In a preferred embodiment of the invention, the brake ring and the body of the connector are linked together by a helical link. Such a helical link can be implemented in any appropriate manner, such as for example by means of pegs arranged either on the body of the connector or on the brake ring and moving in a helical slideway formed in the other one of these two components. In a preferred variant embodiment, the helical link makes use of at least one thread formed inside the brake ring co-operating with a complementary thread formed on the outside of the body of the connector. Naturally, it is possible to envisage implementing a plurality of threads depending on the pitch used so as to ensure that the passage of the brake ring between its disengaged position and its braking position is performed by a turning movement of small amplitude, e.g. less than one turn.

In a preferred but non-exclusive embodiment, the direction of rotation of the brake ring for passing from the braking position to the disengaged position is opposite to the direction of rotation of the locking sleeve for passing from the locking position to the unlocking position.

Such opposition between the directions of rotation of the brake ring and of the locking sleeve serve to guarantee that the brake ring is effective. When the brake ring and the locking sleeve are in co-operation with each other, or merely in contact with each other, any movement for unlocking the locking sleeve tends to move the ring towards its braking position, while any movement for disengaging the ring tends to accentuate the locking of the sleeve. Thus, disengaging the ring and then unlocking the sleeve can be performed only in intentional manner by a user. When helical links are implemented between the body of the connector and both the locking sleeve and the brake ring, these helical links are oppositely-handed. More particularly, the thread of the sleeve and the helical link between the ring and the body of the connector are oppositely-handed.

In the invention, co-operation between the brake ring and the locking sleeve in the braking position of the ring can be implemented in any suitable manner, and in a preferred embodiment, in the braking position, the brake ring bears against the locking sleeve.

According to a characteristic of the invention seeking to oppose any rotation about the axis X-X' of the body of the connector relative to the body of the complementary connector after plugging, the connector includes one or more locking means for co-operating with complementary blocking means provided by the complementary connector.

In the invention, the blocking means may be made in any appropriate manner, and may for example result from the shapes adopted for the body of the connector and for the complementary connector. Thus, the mutually co-operating portions of the body of the connector and of the complementary connector may present elongate right cross-sections, for example they may be oval or oblong, or they may present polygonal right cross-sections, such as for example rectangular sections.

According to a characteristic of the invention, the blocking means comprise at least one groove or key formed in or on the body of the connector.

In the invention, the connection means are adapted to provide connections with various types of conductor in electric and/or optical cables. Thus, the connection means of the invention may be designed to provide a connection with a single optical fiber or with the conductors of a coaxial cable, or with the electrical conductors of a multi-pole or multi-conductor cable. The connection means may also be adapted to provide connections for conductors of a combined cable having both optical fibers and electrical conductors.

According to a characteristic of the invention, the connection means are adapted to provide connection for the conductors of a coaxial cable.

Naturally, the various characteristics, forms, and variants of the invention can be associated with one another in various combinations insofar as they are not mutually incompatible or exclusive of one another.

BRIEF DESCRIPTION OF THE DRAWINGS

Various other characteristics of the invention appear from the following description made with reference to the accompanying drawings that show non-limiting embodiments of a connector of the invention.

MORE DETAILED DESCRIPTION

Figure 1:
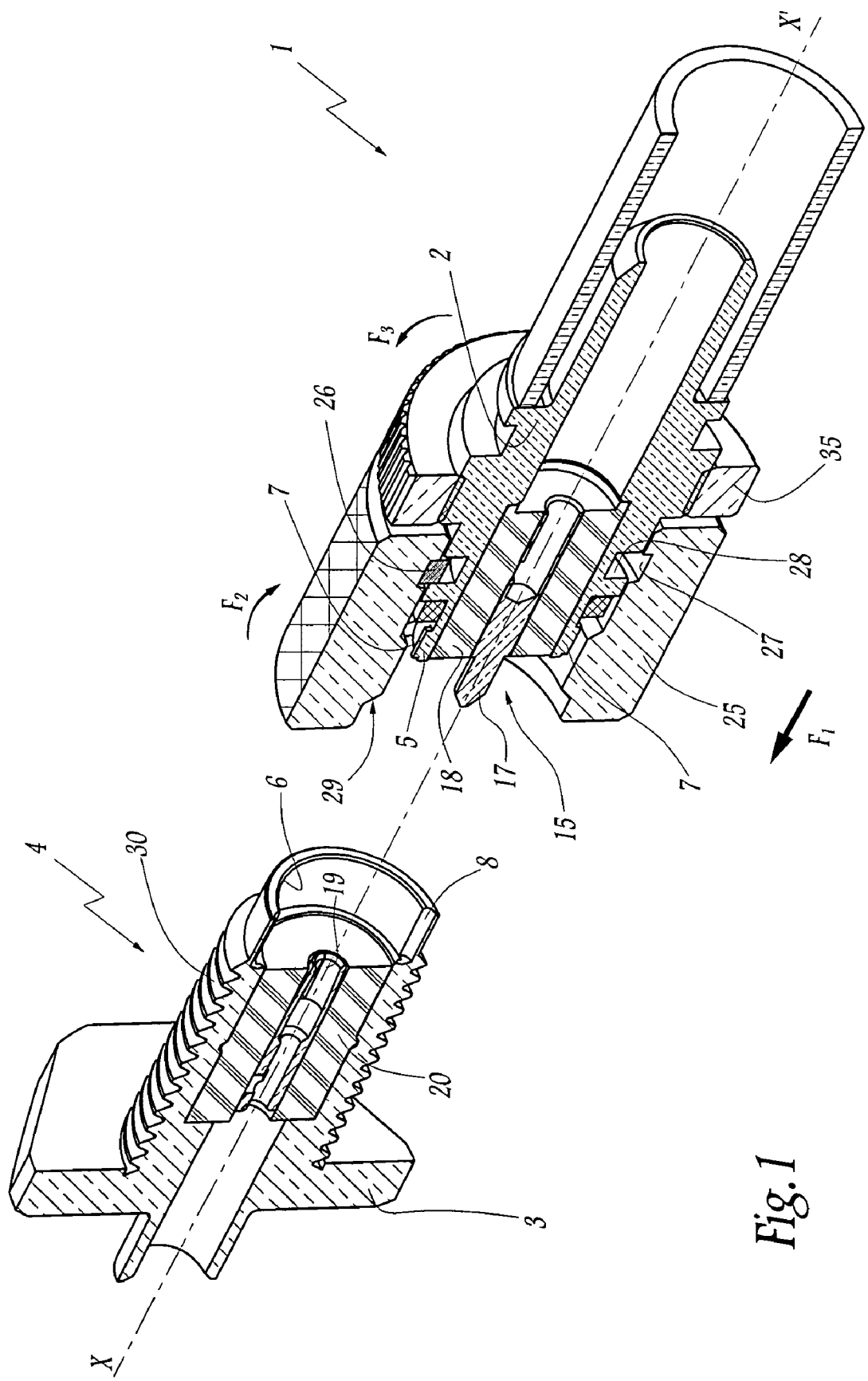
FIG. 1 is a partially cutaway perspective view showing a connector of the invention designed to connect together the conductors of a coaxial cable and placed facing a complementary connector with which it is to co-operate.

A connector of the invention, as shown in FIG. 1, is given overall reference 1 and comprises a body 2 for plugging in a plugging axis X-X' in the body 3 of a complementary connector given overall reference 4. In the example shown, the functional end 5 of the body 2 possesses a male shape generally in the form of a cylinder of revolution that is designed to be engaged by moving in translation into a housing of complementary shape 6 provided in the body 3 of the complementary connector 4. Given that the housing 6 and the end 5 are in the form of cylinders of revolution, the connector 1 includes means for preventing the body 2 from turning relative to the body 3, said means being in the form of keys 7 arranged on the outside surface of the active end 5 and designed to engage in complementary grooves 8 arranged in the housing 6 of the complementary connector 4.

In order to perform its function of connecting conductors together, electrically and/or optically, the connector 1 further includes connection means 15 for co-operating with complementary connection means 16 provided by the complementary connector 4. In the example shown, the connector 1 is designed to connect together the electrical conductors of a coaxial cable (not shown). Thus, the connection means 15 comprise a central contact 17 for connection to the central conductor of the coaxial cable, while the body 2 of the connector 1 is made of a conductive material so as to provide continuity for the shielding conductor with which it is electrically connected. The contact 17 is held inside the body 2 by an insulating sheath 18.

In the same manner, the complementary connection means 16 comprises a central contact 19 in the form of a conductive sheath 19 for receiving the contact 17 and for connection to a conductor corresponding to the central conductor of the coaxial cable. Just like the body 2, the body 3 of the complementary connector 4 is likewise made of conductive material so as to provide an electrical connection between the shielding with which the complementary connector 4 is associated and the body 2 and the shielding of the coaxial conductor associated therewith. In the example shown, the central contact 19 is held inside the body 3 by an insulating sheath 20.

In order to ensure that the connection provided by the connector 1 of the invention and its complementary connector 4 is reliable, the connector 1 of the invention includes a locking sleeve 25 that surrounds the body 2. The locking sleeve 25 in the example shown is connected to the body 2 via a pivoting link implemented by a resilient ring 26 engaged simultaneously in a groove 27 in the sleeve 25 and a corresponding groove 28 in the body 2. The sleeve 25 is thus constrained in translation in the plugging axis X-X' while being free to turn around said plugging axis X-X'. The locking sleeve 25 further includes locking means in the form of an inside thread 29 designed to co-operate with an outside thread 30 provided on the body 3 of the complementary connector 4.

The connector 1 of the invention and its complementary connector 4 are used as follows when they are to be connected together.

Figure 2:
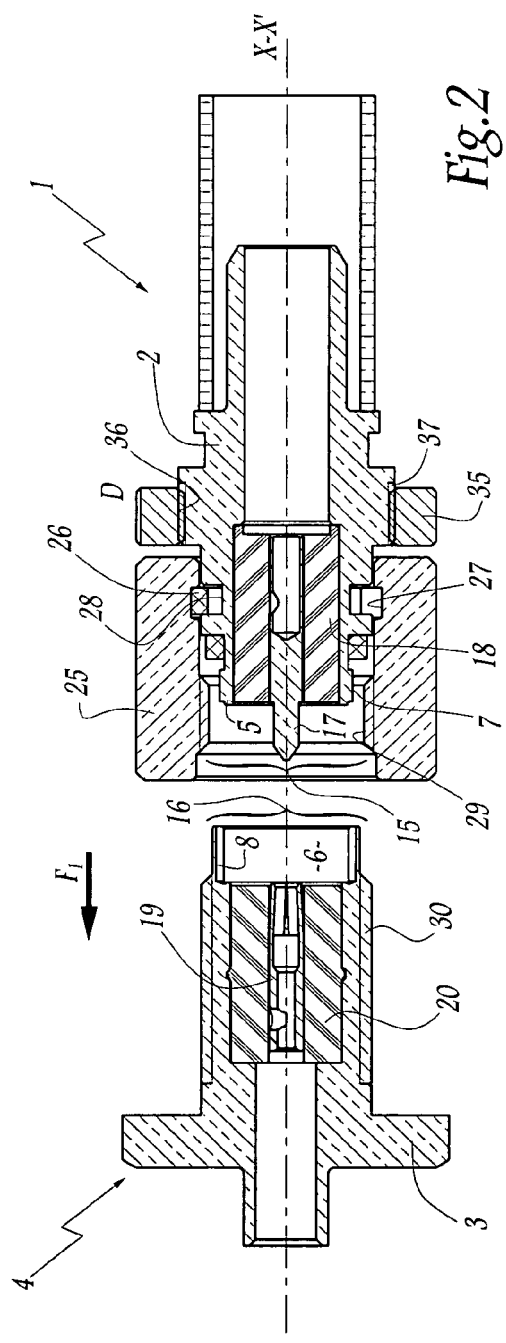
FIG. 2 is a longitudinal section through the connectors shown in FIG. 1.
Figure 3:
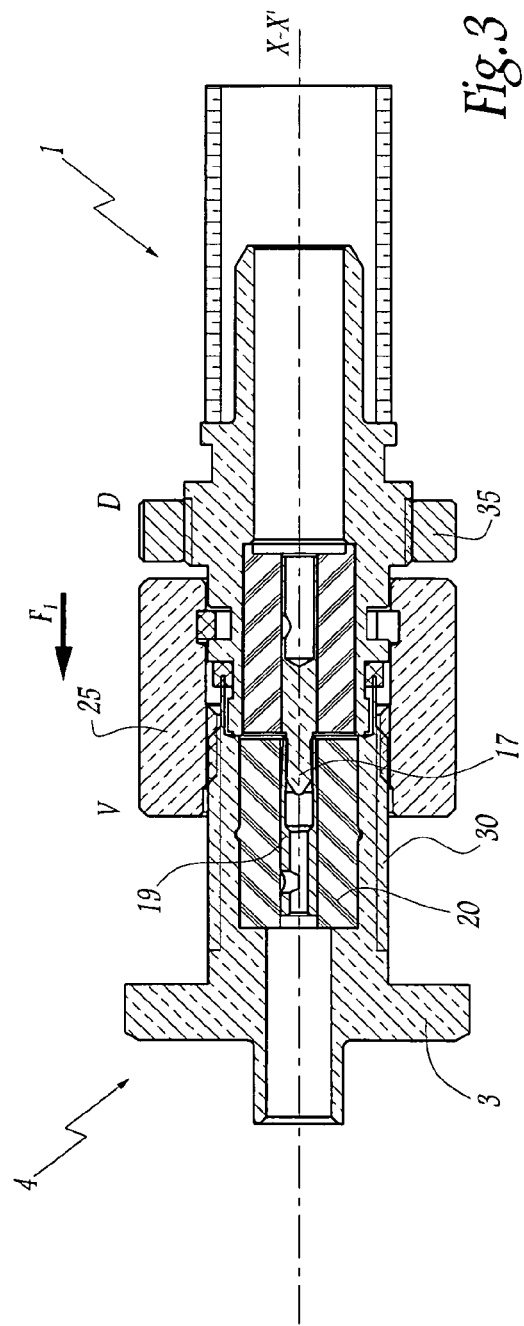
FIG. 3 is an axial section of the connector and the complementary connector shown in FIG. 1, when coupled together with the locking sleeve of the connector of the invention being in the locking position while the brake ring of the connector of the invention is in a disengaged position.
Figure 4:
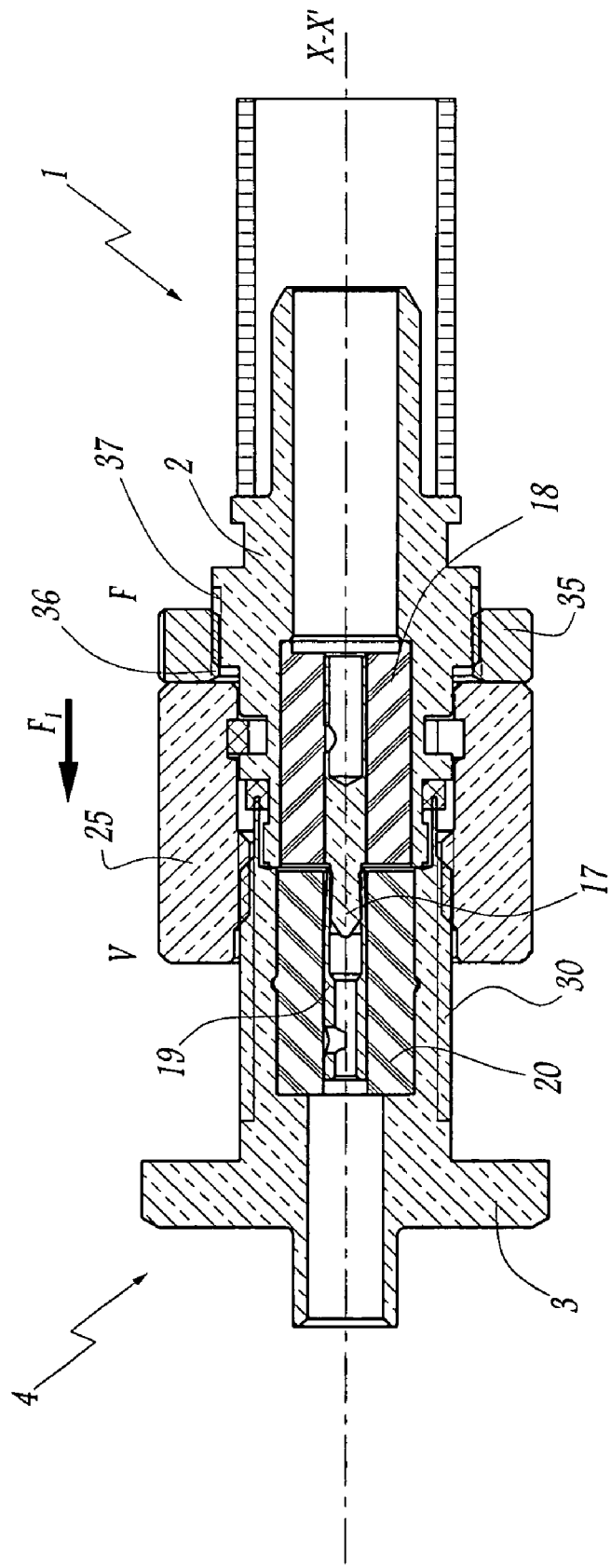
FIG. 4 shows the connector of the invention and its complementary connector when coupled together, the locking sleeve being in the locking position, while the brake ring is in the braking position, so as to oppose turning of the locking sleeve.

Firstly, the active end 5 of the body 2 is plugged into the complementary housing 6 of the body 3 by being moved in translation in the direction of arrow $F_1$ along the plugging axis X-X'. During this plugging, the keys 7 are placed so as to coincide with the grooves 8, the end of each key 7 being engaged in the corresponding end of a corresponding groove 8, thereby preventing any turning of the body 2 relative to the body 3. Thereafter, the locking sleeve 25 is turned in the direction of arrow $F_2$ so as to engage the thread 29 on the thread 30 of the body 3. This turning in the direction of arrow F₂ induces complementary movement in translation in the direction of arrow F₁ until the locking sleeve is brought into the locking position V, as shown in FIG. 3. At this stage, the electrical connection means 15 and 16 are in full co-operation, thereby providing electrical continuity between the conductors associated therewith. Nevertheless, the locking sleeve 25 can still become unscrewed under the effect of vibration or impacts to which it might be subjected. In order to prevent any such risks of unscrewing, the invention provides for implementing a brake ring 35 that co-operates with the body 2 of the connector so as to be movable in rotation at least about the plugging axis X-X' between a disengaged position D, as shown in FIGS. 2 and 3, and a braking position F as shown more particularly in FIG. 4. In the braking position F, the brake ring 35 bears against the locking sleeve 25 so as to oppose any turning thereof. In the example shown, the brake ring 35 is linked to the body 2 via a helical link resulting from co-operation between a thread 36 formed inside the ring 35 and co-operating within an outside thread 37 provided on the body 2. In the example shown, the threads 36 and 37 are oppositely-handed to the threads 29 and 30. Thus, when the sleeve 25 is in the locking position V, the brake ring 35 has been taken from its disengaged position D as shown in FIG. 3 to its braking position F as shown in FIG. 4 by being turned in the direction of arrow F₃ (FIG. 1) that is opposite to the direction for screw-tightening the sleeve 25, as shown by arrow F₂. When the locking sleeve 25 and the brake ring 35 are in contact with each other, as shown in FIG. 4, any turning of the locking sleeve 25 in its loosening direction, corresponding to the direction of arrow F₃, corresponds to tightening the brake ring 35 and thus to moving it towards the sleeve 25, thereby increasing the braking force provided by the ring 35. Similarly, any turning of the brake ring 35 in the direction of arrow F₂ contributes to tightening the locking sleeve 25. Furthermore, it should be observed that the keys 7 and the grooves 8 eliminate any risk of unlocking by opposing any turning of the connector 1 as a whole relative to the complementary connector 4.

Figure 5:
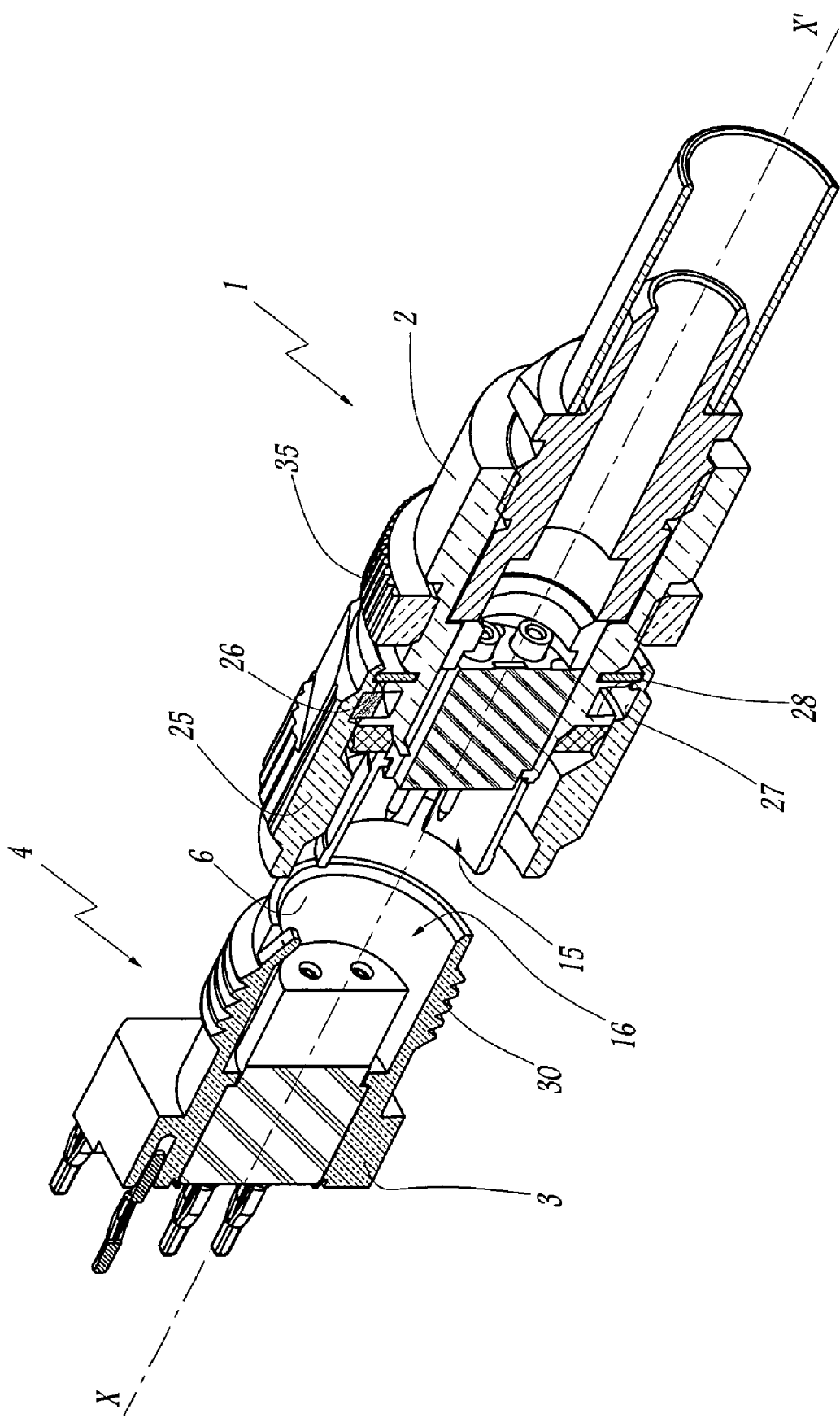
FIG. 5 is a cutaway perspective view showing a connector of the invention and its complementary connector designed to provide connections with a four-pole cable, only two of the poles of the connection means of the connectors being visible in the figure.

In the example shown, the connection means 15 and 16 are designed to provide connections for the two conductors of a coaxial cable. Nevertheless, the invention can equally well be used with multi-pole connectors, e.g. designed to provide a connection with a four-pole cable having four conductors, as shown in FIG. 5.

Furthermore, in the examples shown, the brake ring 35 is linked to the body 2 by a helical link that operates in the opposite direction to that between the locking sleeve 25 and the body 3 of the complementary connector 4. Nevertheless, in the invention, the helical link between the brake ring 35 and the body 2 could be in the same direction as the link between the locking sleeve 25 and the body 3 with the same pitch, or on the contrary with a different pitch. Different pitch values then contribute to increasing friction between the ring 35 and the sleeve 25. In a particularly preferred embodiment, the braking provided by the ring 35 results from friction between said ring 35 and the locking sleeve 25.

Furthermore, in the examples shown, the locking sleeve 25 is connected via a pivoting connection to the body 2. Nevertheless, in the invention, the locking sleeve 25 could also have a degree of freedom to move in axial translation relative to the body 2 insofar as, when in the locking position, it opposes any disengagement of the connector 1 from its complementary connector 4.

Similarly, in the examples shown, the invention is applied to straight connectors, but it could equally well be implemented with angled connectors.

Naturally, various other modifications could be provided to the connector of the invention within the ambit of the claims.

What is claimed is:

1. A connector for electrical or optical conductors comprising:
    a first body for plugging in or on a second body of a complementary connector along a plugging axis X-X';
    first connection means carried by the first body for co-operating with second complementary connection means of the complementary connector so as to connect together electrical or optical conductors;
    a locking sleeve surrounding the first body of the connector and that is adapted to co-operate with the second body of the complementary connector and with locking means provided by the complementary connector in such a manner as to block relative movement between the first body and the second body of the complementary connector in the plugging direction, the locking sleeve being movable in rotation about the axis X-X' relative to the first body of the connector between an unlocking position in which the first body can be separated from the second body and a locking position in which the first body cannot be separated from the second body; and
    a brake ring mounted to and that co-operates with the first body of the connector by being movable at least in rotation about the axis X-X' between a braking position in which the ring opposes any turning of the locking sleeve when the locking sleeve is in the locked position and a disengaged position in which the ring does not oppose any turning of the locking sleeve; and
    wherein the direction of rotation of the brake ring for going from the braking position to the disengaged position is opposite to the direction of rotation of the locking sleeve to go from the locking position to the unlocking position.

2. The connector according to claim 1, wherein the locking sleeve includes helical link means for co-operating with the locking means of the complementary connector.

3. The connector according to claim 2, wherein the helical link means includes a thread formed on one of an inside or outside of the locking sleeve and designed to co-operate with a complementary thread provided by the complementary connector.

4. The connector according to claim 1, wherein the brake ring and the first body of the connector are linked together by a helical link.

5. The connector according to claim 3, wherein the brake ring and the first body of the connector are linked together by a helical link, and wherein the thread of the sleeve and the helical link between the ring and the first body of the connector are oppositely-handed.

6. The connector according to claim 1, wherein in the braking position, the brake ring bears against the locking sleeve.

7. The connector according to claim 1, including one or more locking means for co-operating with complementary blocking means provided by the complementary connector to oppose rotation about the axis X-X' between the first body of the connector and the second body of the complementary connector when the first and second bodies are plugged one in the other.

8. The connector according to claim 7, wherein the blocking means include at least one groove or key formed in or on the first body of the connector.

9. The connector according to claim 1, wherein the connection means are adapted to provide connection for conductors of a coaxial cable.

* * * * *